(12) United States Patent
Tanaka

(10) Patent No.: US 9,874,953 B2
(45) Date of Patent: Jan. 23, 2018

(54) VEHICLE OPERATING SYSTEM AND INFORMATION DEVICE

(71) Applicant: DENSO CORPORATION, Kariya, Aichi-pref. (JP)

(72) Inventor: Kimiaki Tanaka, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 231 days.

(21) Appl. No.: 14/760,967

(22) PCT Filed: Dec. 23, 2013

(86) PCT No.: PCT/JP2013/007522
§ 371 (c)(1),
(2) Date: Jul. 14, 2015

(87) PCT Pub. No.: WO2014/112016
PCT Pub. Date: Jul. 24, 2014

(65) Prior Publication Data
US 2015/0355731 A1   Dec. 10, 2015

(30) Foreign Application Priority Data
Jan. 15, 2013   (JP) .................................. 2013-004526

(51) Int. Cl.
*G06F 3/033*   (2013.01)
*G06F 3/0362*   (2013.01)
(Continued)

(52) U.S. Cl.
CPC ............ *G06F 3/0362* (2013.01); *B60K 35/00* (2013.01); *G06F 3/038* (2013.01); *G06F 3/0487* (2013.01);
(Continued)

(58) Field of Classification Search
CPC ...... G06F 3/0362; G06F 3/038; G06F 3/0487; G06F 2203/0384; B60K 35/00; B60K 2350/102
See application file for complete search history.

(56) References Cited

U.S. PATENT DOCUMENTS

| 8,177,182 B1 | 5/2012 | Wood et al. |
| 2001/0048423 A1 | 12/2001 | Rekimoto |

(Continued)

FOREIGN PATENT DOCUMENTS

| JP | H10049290 A | 2/1998 |
| JP | H10144182 A | 5/1998 |

(Continued)

OTHER PUBLICATIONS

International Search Report and Written Opinion (in Japanese with English Translation) for PCT/JP2013/007522, dated Apr. 1, 2014; ISA/JP.

*Primary Examiner* — Peter D McCloone
(74) *Attorney, Agent, or Firm* — Harness, Dickey & Pierce, P.L.C.

(57) ABSTRACT

A vehicle operating system includes an operating device disposed in a vehicle compartment and an in-vehicle device equipped to the vehicle and selecting graphical user interface displayed on a display device corresponding to selection manipulation made to the operating device. The operating device includes a base capable of being disposed by a user, a rotatable knob supported by the base, a posture detector detecting an attachment posture of the operating device, a connection unit connectable to the in-vehicle device, a manipulation signal output unit outputting a manipulation signal of the rotatable knob, and a posture signal output unit outputting an attachment posture signal. The in-vehicle device includes a display control unit controlling the display device to display the graphical user interface corresponding to the attachment posture signal, (Continued)

and a selection display unit controlling the display device to perform selection display of the graphic user interface corresponding to the manipulation signal.

17 Claims, 8 Drawing Sheets

(51) Int. Cl.
*G06F 3/038* (2013.01)
*G06F 3/0487* (2013.01)
*B60K 35/00* (2006.01)

(52) U.S. Cl.
CPC .......................... *B60K 2350/102* (2013.01); *G06F 2203/0384* (2013.01)

(56) References Cited

U.S. PATENT DOCUMENTS

| | | | |
|---|---|---|---|
| 2003/0076968 A1* | 4/2003 | Rast | G11B 19/027 381/124 |
| 2004/0141007 A1 | 7/2004 | Amari et al. | |
| 2004/0195031 A1 | 10/2004 | Nagasaka | |
| 2010/0164888 A1 | 7/2010 | Okumura et al. | |
| 2010/0259375 A1* | 10/2010 | Ferren | B60K 35/00 340/462 |
| 2011/0267759 A1* | 11/2011 | Abram | B60R 11/0235 361/679.27 |

FOREIGN PATENT DOCUMENTS

| | | |
|---|---|---|
| JP | 2002082773 A | 3/2002 |
| JP | 2004217169 A | 8/2004 |
| JP | 2004345552 A | 12/2004 |
| JP | 2005001587 A | 1/2005 |
| JP | 2007160981 A | 6/2007 |
| JP | 2007186198 A | 7/2007 |
| JP | 2011204485 A | 10/2011 |
| JP | 2012142001 A | 7/2012 |
| JP | 2012147440 A | 8/2012 |

* cited by examiner

VEHICLE OPERATING SYSTEM AND INFORMATION DEVICE

CROSS REFERENCE TO RELATED APPLICATIONS

This application is a U.S. National Phase Application under 35 U.S.C. 371 of International Application No. PCT/JP2013/007522 filed on Dec. 23, 2013 and published in Japanese as WO 2014/112016 A1 on Jul. 24, 2014. This application is based on and claims the benefit of priority from Japanese Patent Application No. 2013-004526 filed on Jan. 15, 2013. The entire disclosures of all of the above applications are incorporated herein by reference.

TECHNICAL FIELD

The present disclosure relates to a vehicle operating system including an operating device, and also relates to an information device. The operating device is disposed in a compartment of a vehicle and a position of the operating device in the compartment of the vehicle is changeable by a user. The information device is capable of being carried into the compartment of the vehicle and being used in the compartment of the vehicle.

BACKGROUND ART

As a multifunctional operating switch system mounted to a vehicle, a system usually includes a display device displaying operation states of in-vehicle devices including meters, an air conditioner, an audio device, and a car navigation device, and also includes a multifunctional switch (operating device) used for operating the in-vehicle devices (refer to, for example, patent literature 1). The multifunctional switch includes a round-shaped operating button. Instructions for hierarchical selecting, determining, and executing of items displayed on the screen of the display device can be performed by manipulating or pressing (tilting) any of the up, down, left, and right part of the perimeter of the operating button, or pushing the center of the operating button. Herein, the volume of the audio device can be adjusted irrespective of the hierarchy by manipulating or rotating the operating button.

The above multifunctional switch is attached in fixed manner to, for example, a central portion of an instrument panel (cluster lid C) in the vicinity of a driver seat. No consideration has been taken into for free movement of the multifunctional switch. There are users' needs for attaching the operating device to a top portion of a dashboard, to a portion between a user seat and a passenger seat, to a side portion of a door, to a side portion or to a top portion of a steering wheel, to a side portion or to a top portion of a steering column, to a ceiling, to a rear seat, or to any other place except for the central portion of the instrument panel.

In this case, assuming that the operating device is able to freely attachable and detachable, and is able to connect to an in-vehicle device (display device) in wireless manner (or in wired manner) in order to configure a system, the users' needs for freely disposing the operating device in an arbitrary place can be satisfied. However, the manipulating direction of the operating device and the arrangement direction in which items are aligned on a screen of the display device (cursor moving direction) may be different from each other. This inconsistency may cause the user to feel uncomfortable during the manipulation, and may degrade a manipulation performance of the operating device.

In recent years, a user often carries his or her information device, for example, a smartphone, a portable navigation device, or a tablet type personal computer into a compartment of the vehicle and sets the information device on an instrument panel for use, and operates the information device. In this case, if the operating device can be used to operate the information device carried by the user, the operating device may further improve user experience.

PRIOR ART LITERATURES

Patent Literature

[Patent Literature 1] JP H10-144182 A

SUMMARY OF INVENTION

In view of the foregoing difficulties, it is an object of the present disclosure to provide a vehicle operating system a vehicle operating system and an information device each of which supports a free disposing of an operating device for operating an in-vehicle device or the information device by a user in a vehicle compartment and secures an improved manipulation performance of the operating device.

According to a first aspect of the present disclosure, a vehicle operating system includes an operating device disposed in a vehicle compartment and an in-vehicle device equipped to the vehicle and including a display device. The in-vehicle device selects a graphical user interface displayed on a screen of the display device of the in-vehicle device corresponding to a selection manipulation made by a user to the operating device. The operating device includes a base attaching the operating device to a portion in the compartment of the vehicle according to a personal predilection of the user, a rotatable knob supported by the base and being rotatable in response to a rotation manipulation made by the user, a posture detector detecting an attachment posture of the operating device and generating an attachment posture signal indicating the attachment posture of the operating device, a connection unit connecting the operating device to the in-vehicle device, a manipulation signal output unit outputting, to the in-vehicle device, a manipulation signal that is generated in response to a rotation of the rotatable knob, and a posture signal output unit outputting, to the in-vehicle device, the attachment posture signal generated by the posture detector. The in-vehicle device includes a display control unit controlling the display device to display the graphical user interface corresponding to the attachment posture signal output from the posture signal output unit, and a selection display unit controlling the display device to perform a display related to the selection of the graphical user interface in a display mode corresponding to the manipulation signal output from the manipulation signal output unit.

The above vehicle operating system enables a free disposing of the operating device for operating the in-vehicle device in the vehicle compartment by the user and secures an improved manipulation performance of the operating device.

According to a second aspect of the present disclosure, a vehicle operating system includes an operating device disposed in a compartment of a vehicle and a hand-carried information device carried into the compartment of the vehicle by a user and including a display device. The hand-carried information device selects a graphical user interface displayed on a screen of the display device of the hand-carried information device corresponding to a selection manipulation made by the user to the operating device. The operating device includes a base attaching the operating device to a portion in the compartment of the vehicle according to a personal predilection of the user, a rotatable knob supported by the base and being rotatable in response to a rotation manipulation made by the user, a posture detector detecting an attachment posture of the operating device and generating an attachment posture signal indicating the attachment posture of the operating device, a connection unit connecting the operating device to the hand-carried information device, a manipulation signal output unit outputting, to the hand-carried information device, a manipulation signal that is generated in response to a rotation of the rotatable knob, and a posture signal output unit outputting, to the hand-carried information device, the attachment posture signal generated by the posture detector. The hand-carried information device includes a display control unit controlling the display device to display the graphical user interface corresponding to the attachment posture signal output from the posture signal output unit, and a selection display unit controlling the display device to perform a display related to the selection of the graphical user interface in a display mode corresponding to the manipulation signal output from the manipulation signal output unit.

The above vehicle operating system enables a free disposing of the operating device for operating the hand-carried information device carried into the vehicle compartment in the vehicle compartment by the user and secures an improved manipulation performance of the operating device.

According to a third aspect of the present disclosure, an information device disposed in a compartment of a vehicle includes a display device, a display control unit controlling the display device to display a graphical user interface on a screen of the display device corresponding to an attachment posture of an operating device, and a selection display unit controlling the display device to perform a display related to a selection of the graphical user interface corresponding to a manipulation signal transmitted from the operating device. The operating device is attached in the compartment of the vehicle by a user according to a personal predilection of the user. The graphical user interface displayed on the screen of the display device is selected based on a selection manipulation made by the user to the operating device.

The above information device can avoid or restrict an uncomfortable feeling of the user while displaying the graphic user interface corresponding to the manipulation made to the operating device.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

First Embodiment

Figure 1:
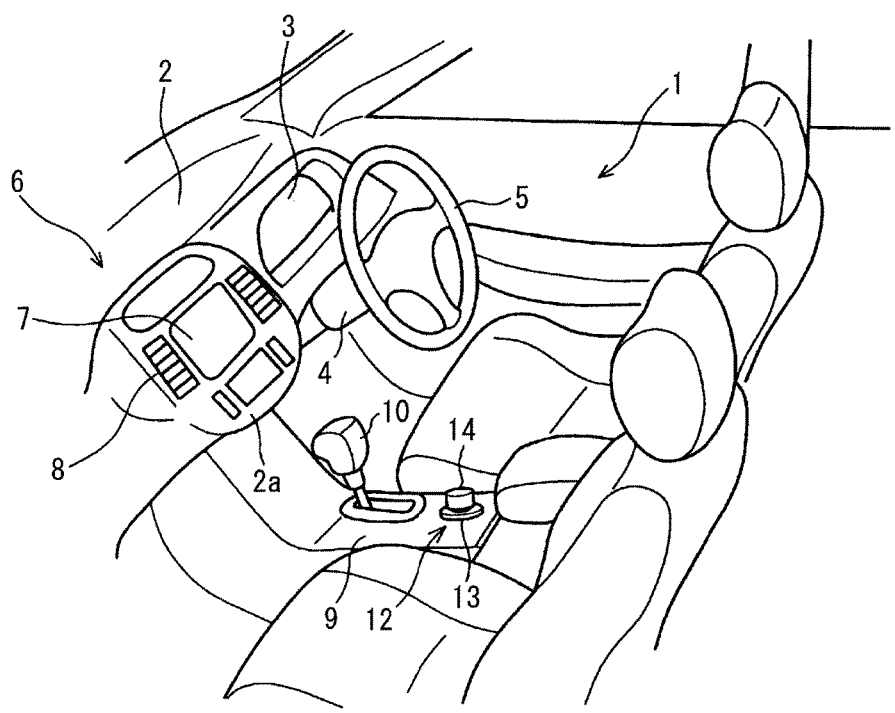
FIG. 1 is a diagram schematically showing a perspective view of a driver seat area in a vehicle compartment according to a first embodiment of the present disclosure.

The following will describe a first embodiment of the present disclosure with reference to FIG. 1 to FIG. 5B. FIG. 1 schematically shows an arrangement in a compartment 1 of a vehicle (passenger car) in the vicinity of a driver seat. Herein, an instrument panel 2 is located on the front side of the driver seat. A meter unit 3 is included in the instrument panel 2 in an embedded manner. A steering wheel 5 supported by a steering column 4 is disposed in front of the meter unit 3. That is, the steering wheel 5 is closer to the driver seat compared with the meter unit 3. The meter unit 3 includes a speedometer, tachometer, fuel meter, water temperature gauge, and various warning lamps, though they are not shown.

A vehicle operating system 6 according to the present embodiment includes a display device 7 that is embedded at a central portion 2a of the instrument panel 2. The display device 7 is provided by, for example, a color liquid crystal display. The display device 7 displays various screen images including a map screen image and a screen image for controlling (instructing or selecting) each in-vehicle device. In the vicinity of the display device 7, an operating switch unit (OP SW) 8 including multiple mechanical switches is disposed. A shift lever 10 is located at a center console 9 between the driver seat and a front passenger seat.

Figure 2:
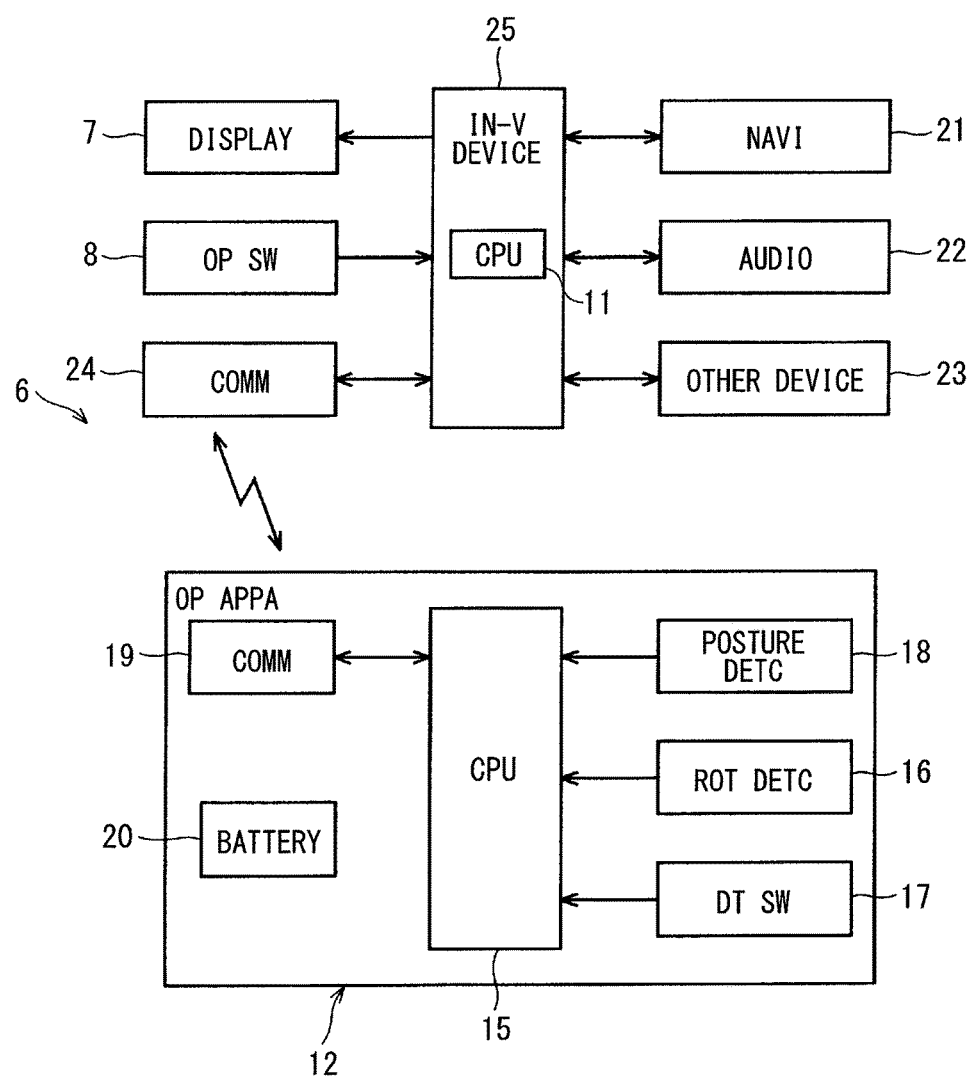
FIG. 2 is a block diagram schematically showing an electric configuration of a main part of a vehicle operating system according to the first embodiment of the present disclosure.

The vehicle operating system 6 according to the present embodiment includes, as shown in FIG. 2, the display device (DISPLAY) 7, an in-vehicle device (IN-V DEVICE) 25, and a unitized operating device (OP APPA) 12. The display device 7 includes a central processing unit (CPU) 11 that controls a display on the display device 7. The operating device 12 is disposed so that a user can perform a selection operation on a graphical user interface (GUI) displayed on the screen of the display device 7. The operating device 12 enables an instruction input, a selection, or a setting of each in-vehicle device. The graphical user interface is referred to as graphics for simplification.

As shown in FIG. 1, the operating device 12 includes, for example, a disk-shaped base 13 and a cylindrical rotatable knob 14 disposed on the disk-shaped base 13. The knob 14 is rotatable and pressable, and can be manipulated both in rotation manner and in push or pressing manner. The operating device 12 (base 13) can be freely attached, in any posture, to a portion inside the compartment 1 of the vehicle according to a personal predilection of the user in a detachable manner.

More particularly, for example, the operating device 12 can be attached to (the position to which the operating device is attached can be varied among) a position below the display device 7 at the central portion 2a of the instrument panel 2, an upper surface of the center console 9 (behind the shift lever 10), an upper surface of the steering column 4, a left side surface or a right side surface of the steering column 4, an upper surface (spoke surface) of the steering wheel 5, an internal surface of the door adjacent to the driver seat or an internal surface of the door adjacent to the front passenger seat, a surface of the ceiling, a position in the vicinity of a rear seat, or any other position that conforms to the personal predilection of the user. The present embodiment does not specifically limit a method of attaching the operating device 12 to any one of above-described parts of the compartment 1. For example, the operating device 12 may be attached to a position by screwing, mechanical engagement, attraction using a magnet, or adhesion using a double-sided tape.

As in FIG. 2, the operating device 12 includes a CPU 15 that controls the entire device, a rotation detector (ROT DETC) 16 that detects a rotation amount (including a rotation direction) of the rotatable knob 14, and a determination switch (DT SW) 17 that is turned on when the rotatable knob 14 is pressed. For example, the rotation detector may be provided by a rotary encoder. The rotation detector 16 and the determination switch 17 generate detection signals, and output the detection signals to the CPU 15.

The operating device 12 further includes a posture detection sensor (POSTURE DETC) 18 that detects an attachment posture of the operating device 12. The posture detection sensor 18 functions as a posture detector. The posture detection sensor 18 includes one or more sensors such as a gyro sensor, a tilt sensor, and an acceleration sensor. The posture detection sensor 18 detects, as the attachment posture of the operating device 12, an orientation direction of the rotatable knob 14 (direction in which a rotating axial center extends) with reference to a traveling direction of a vehicle. The posture detection sensor 18 generates a detection signal, and outputs the detection signal to the CPU 15.

The operating device 12 further includes a communication unit (COMM) 19 connected to the CPU 15. In the present embodiment, the communication unit 19 is provided by a near field communication unit (wireless communication unit) conformable to, for example, Wi-Fi (registered trademark) or Bluetooth (registered trademark). The communication unit 19 functions as a connection unit that connects the CPU 15 of the operating device 12 to the CPU 11 of the in-vehicle device 25 by communicating with a communication unit (COMM) 24 connected to the CPU 11. The operating device 12 has a built-in battery (BATTERY) 20 which serves as a power supply.

FIG. 2 schematically shows the electrical configuration of the vehicle operating system 6 (CPU 11) according to the present embodiment and peripheral components of the vehicle operating system 6. The display device 7 and the operating switch unit 8 are connected to the CPU 11. The CPU 11 is connected to the navigation device (NAVI) 21 and audio device (AUDIO) 22 that configure a part of the in-vehicle devices. As already known, the navigation device 21 performs navigation processing. As the navigation processing, the navigation device 21, for example, detects a position of the vehicle using a GPS, or performs a route guidance. The audio device 22 is able to receive radio signals or television signals, or is able to reproduce a music CD or picture DVD.

The CPU 11 is connected to other in-vehicle devices (OTHER DEVICE) 23 (or ECUs that control the in-vehicle devices) over an onboard network, for example, CAN. The onboard network are not shown in the drawing particularly. The CPU 11 is connected to the communication unit 24 that serves as a connection unit (which performs wireless communication). The communication unit 24 connects the operating device 12 (communication unit 19) with the CPU 11. The communication unit is provided by a near field communication unit conformable to, for example, Wi-Fi or Bluetooth (registered trademark).

The operating device 12 (CPU 15) outputs a detection signal (rotation manipulation signal) of the rotation detector 16, which is generated by a rotation manipulation performed to the rotatable knob 14, and a turning-on signal (determination signal) of the determination switch 17, which is generated by a pressing manipulation performed to the rotatable knob 14. The operating device 12 transmits the detection signal and the turning-on signal to the CPU 11 of the in-vehicle device 25 via the communication unit 19. In addition, the operating device 12 (CPU 15) transmits an attachment posture signal, which is produced by the posture detection sensor 18, to the CPU 11 via the communication unit 19. Therefore, the CPU 15 functions as a manipulation signal output unit and posture signal output unit.

When the CPU 11 of the vehicle operating system 6 receives (inputted with) the signals transmitted from the operating device 12 via the communication unit 24, the CPU 11 performs necessary display on the screen of the display device 7, performs display processing related to selection manipulation according to the rotation manipulation signal, and performs determination processing on the basis of the determination signal. In this case, the CPU 11 uses the software configuration to display, for example, icons as a graphical user interface (GUI) on the screen of the display device 7 so as to prompt a user to perform a selection manipulation to any one of the icons. The CPU 11 may also use the software configuration to display an indicator as the graphical user interface so as to prompt the user to change an indicator needle.

At this time, the CPU 11 displays the graphical user interface (GUI) on the display device 7 in a form corresponding to the attachment posture signal. More particularly, as described later in relation to the operation of the invention, in the present embodiment, an arrangement direction of icons on the screen of the display device 7 (including a position on the screen at which the icons are located) is changed from one direction to another direction, or the orientation of the indicator is changed from one direction to another direction. The CPU 11 therefore functions as a display control unit and selection display unit.

Figure 3:
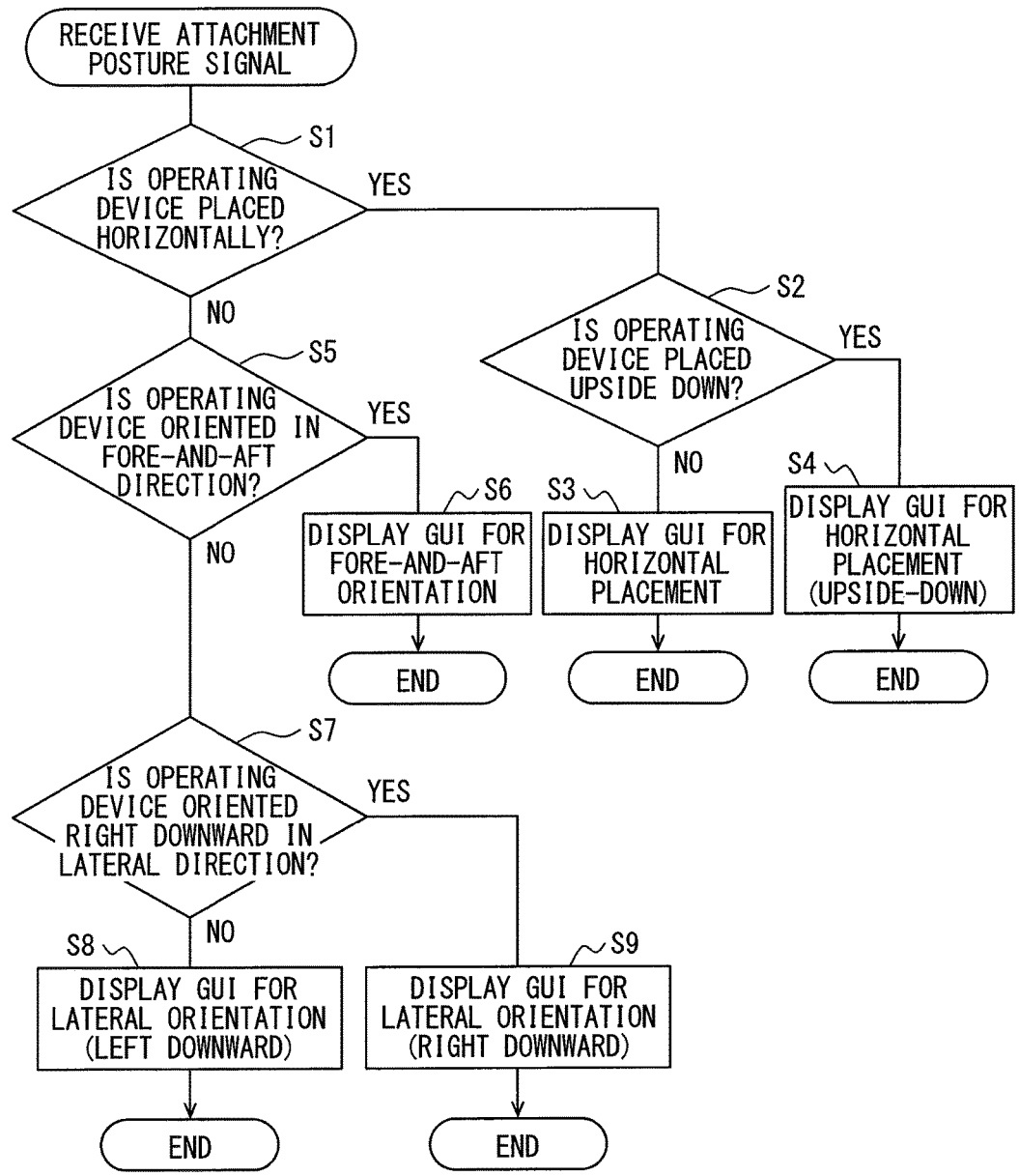
FIG. 3 is a flowchart showing a processing procedure executed by a CPU and relevant to a display mode of a graphical user interface on a screen of a display device.
Figure 4A:
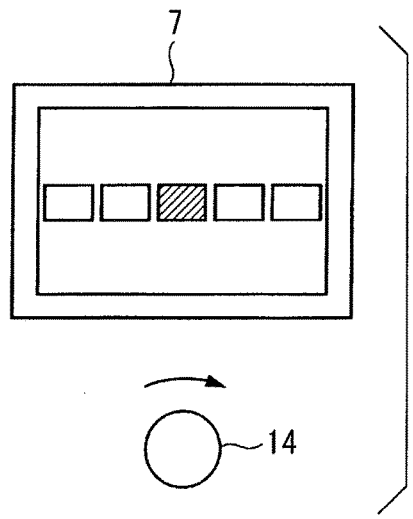
FIG. 4A and FIG. 4B are diagrams showing examples of display of a menu screen image of a navigation device on the display device in relation to two respective postures of an operating device.
Figure 4B:
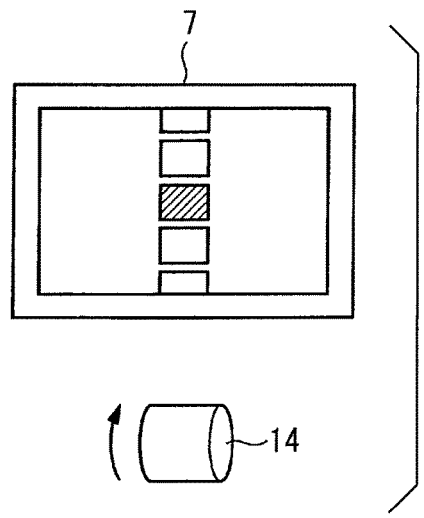
Figure 5A:
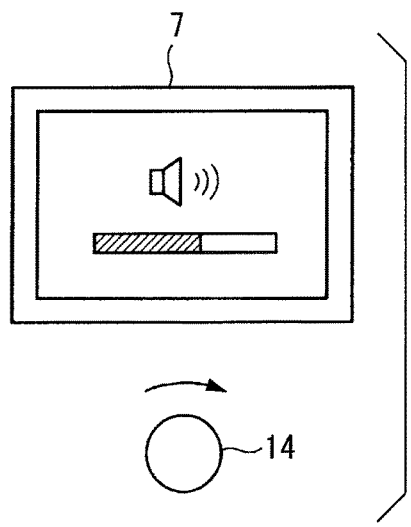
FIG. 5A and FIG. 5B are diagrams showing examples of display of a volume adjustment screen image of an audio device on the display device in relation to two respective postures of the operating device.
Figure 5B:
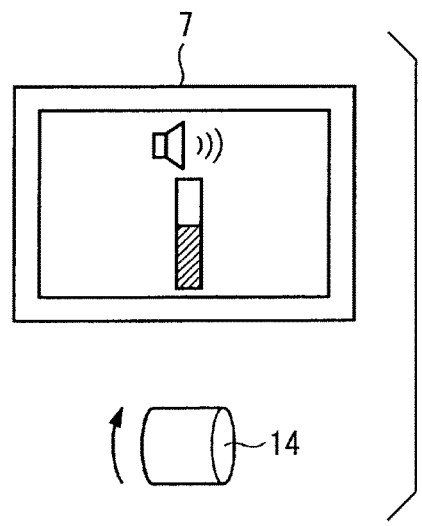

The following will describe an operation of the vehicle operating system 6 having the foregoing configuration with reference to FIG. 3 to FIG. 5B. The flowchart of FIG. 3 describes an outline of a processing procedure that is executed by the CPU 11. Herein, the processing is related to a display mode of a graphical user interface on the screen of the display device 7 when an attachment posture signal is transmitted from the operating device 12. FIG. 4A to FIG. 5B show concrete examples of display on the screen of the display device 7. FIG. 4A and FIG. 4B show an example of display of, for example, a menu selection screen image of the navigation device 21. FIG. 5A and FIG. 5B show an example of display of an audio volume setting screen image of the audio device 22.

It is noted that a flowchart or the processing of the flowchart in the present disclosure includes sections (also referred to as steps), each of which is represented, for instance, as S1. Further, each section can be divided into several sub-sections while several sections can be combined into a single section. Furthermore, each of thus configured sections can be also referred to as a circuit, device, module, or means.

As mentioned above, the operating device 12 can be attached to a position that conforms to the personal predilection of the user in the vehicle component 1. For example, when the operating device 12 (base 13) is attached to the top surface of the center console 9, the attachment posture of the operating device is almost in horizontal placement (the axial center of the rotatable knob 14 is oriented upward). When the operating device 12 is attached to the ceiling of the component 1, the attachment posture of the operating device is almost in horizontal placement (the axial center of the rotatable knob 14 is oriented downward). When the operating device 12 (base 13) is attached to the instrument panel central portion 2a or the spoke of the steering wheel 5, the attachment posture is in fore-and-aft orientation (the axial center of the rotatable knob 14 is oriented forward). When the operating device 12 (base 13) is attached to the left side surface or the right side surface of the steering column 4 or the internal surface of the door, the attachment posture is in lateral orientation (the axial center of the rotatable knob 14 is oriented leftward or rightward).

In the flowchart of FIG. 3, when the CPU 11 receives an attachment posture signal from the operating device 12, the CPU 11 decides at S1 whether the attachment posture of the operating device 12 is in horizontal placement. When the CPU 11 decides that the attachment posture of the operating device 12 is in horizontal placement (S1: YES), the CPU 11 decides at S2 whether the operating device is placed upside down. When the operating device is placed normally horizontally (is not placed upside down) (S2: NO), the CPU 11 displays a graphical user interface (GUI) for horizontal placement on the display device 7 at S3. When the operating device is placed upside down (S2: YES), the CPU 11 displays a graphical user interface for upside-down horizontal placement on the display device 7 at S4.

When the operating device 12 is not placed horizontally (S1: NO), the CPU 11 decides at S5 whether the attachment posture of the operating device 12 is in fore-and-aft orientation. When the attachment posture of the operating device 12 is in fore-and-aft orientation (S5: YES), the CPU 11 displays a graphical user interface for fore-and-aft orientation on the display device 7.

When the attachment posture of the operating device 12 is not in fore-and-aft orientation (S5: NO), the CPU 11 decides at S7 whether the attachment posture of the operating device 12 is in lateral and rightward (right downward) orientation. When the operating device is not oriented rightward (S7: NO), that is, when the operating device is oriented leftward (left downward), the CPU 11 displays a graphical user interface for leftward (left downward) orientation on the display device 7 at S8. When the operating device is oriented rightward (S7: YES), the CPU 11 displays a graphical user interface for rightward (right downward) orientation on the display device 7 at S9.

FIG. 4A and FIG. 4B show examples of display of a menu screen image of the navigation device 21 on the display device 7. Icons are displayed as a graphical user interface on the screen of the display device. For example, when the attachment posture of the operating device 12 is in fore-and-aft orientation, the CPU 11 displays, as in FIG. 4A, icons in a horizontal row on the screen of the display device 7 (S6).

In this case, when the rotatable knob 14 of the operating device 12 is rotated by the user in clockwise direction (rightward), a cursor (hatched in the drawing for convenience' sake) indicating a selected state of an icon (which one of icons is selected) moves rightward one by one on the basis of a signal indicating that the rotatable knob has been rotated in clockwise direction. In contrast, when the rotatable knob 14 is rotated by the user in counterclockwise direction (leftward), the cursor indicating the selected state of an icon moves leftward one by one on the basis of signal indicating that the rotatable knob has been rotated in counterclockwise direction. A user moves the cursor to a target icon, and thereafter manipulates or presses the rotatable knob 14 for determination. When a determination signal is inputted to the operating device, the menu corresponding to the icon is determined.

In contrast, as in FIG. 4B, when the attachment posture of the operating device 12 is in lateral (rightward) orientation, the CPU 11 displays icons in a vertical column on the screen of the display device 7 (S9). In this case, when the rotatable knob 14 is rotated by the user in clockwise direction (rightward), the cursor indicating the selected state of an icon moves upward one by one. When the rotatable knob 14 is rotated by the user in counterclockwise direction (leftward), the cursor indicating the selected state of an icon moves downward one by one.

FIG. 5A and FIG. 5B show examples of display of a volume setting screen image of the audio device 22 on the display device 7. An indicator indicating an audio volume is displayed as a graphical user interface on the screen of the display device 7. In this case, as in FIG. 5A, when the attachment posture of the operating device 12 is in fore-and-aft orientation, the CPU 11 displays the indicator that extends in horizontal direction on the screen of the display device 7. In this case, when the rotatable knob 14 is rotated by the user clockwise (rightward), the display of the indicator changes to a higher volume indication (an indicator needle moves in a direction of increasing toward the right side of the indicator) on the basis of a signal signifying that the rotatable knob has been rotated clockwise. When the rotatable knob 14 is rotated by the user counterclockwise (leftward), the display of the indicator changes to a lower volume indication (the indicator needle moves in a direction of decreasing toward the left side of the indicator).

As in FIG. 5B, when the attachment posture of the operating device 12 is in lateral (rightward) orientation, the CPU 11 displays the indicator that extends in horizontal direction on the screen of the display device 7. In this case, when the rotatable knob 14 is rotated by the user clockwise (rightward), the display of the indicator changes to a higher volume indication (an indicator needle moves in a direction of increasing toward the upper side of the indicator) on the basis of a signal signifying that the rotatable knob has been rotated clockwise. When the rotatable knob 14 is rotated by the user counterclockwise (leftward), the display of the indicator changes to a lower volume indication (the indicator needle moves in a direction of decreasing toward the lower side of the indicator).

As mentioned above, according to the vehicle operating system 6 of the present embodiment, the operating device 12 (base 13) that can be used to perform selection manipulation to a graphical user interface (GUI) on the display device 7 for the purpose of controlling or instructing any one of the in-vehicle devices 21 to 23 can be attached to a position that conforms to the personal predilection of the user in the compartment 1 in an orientation that conforms to a personal predilection of the user. Thus, the vehicle operating system 6 of the present embodiment can satisfy various needs of the users.

In the operating device 12, the attachment posture of the operating device 12 is detected by the posture detection sensor 18. The attachment posture signal is inputted to the CPU 11 that controls the display device 7. Accordingly, the CPU 11 can display a graphical user interface in a form, which is corresponding to the attachment posture of the operating device 12, on the screen of the display device 7. As a result, according to the present embodiment, the operating device 12 for operating the in-vehicle devices 21 to 23 can be attached to a position that conforms to the personal predilection of the user in the compartment 1, and the display related to the operation can keep a user from feeling uncomfortable (makes a user feel less uncomfortable). Thus, the operating device 12 can secure an improved manipulation performance.

Second Embodiment

Figure 6:
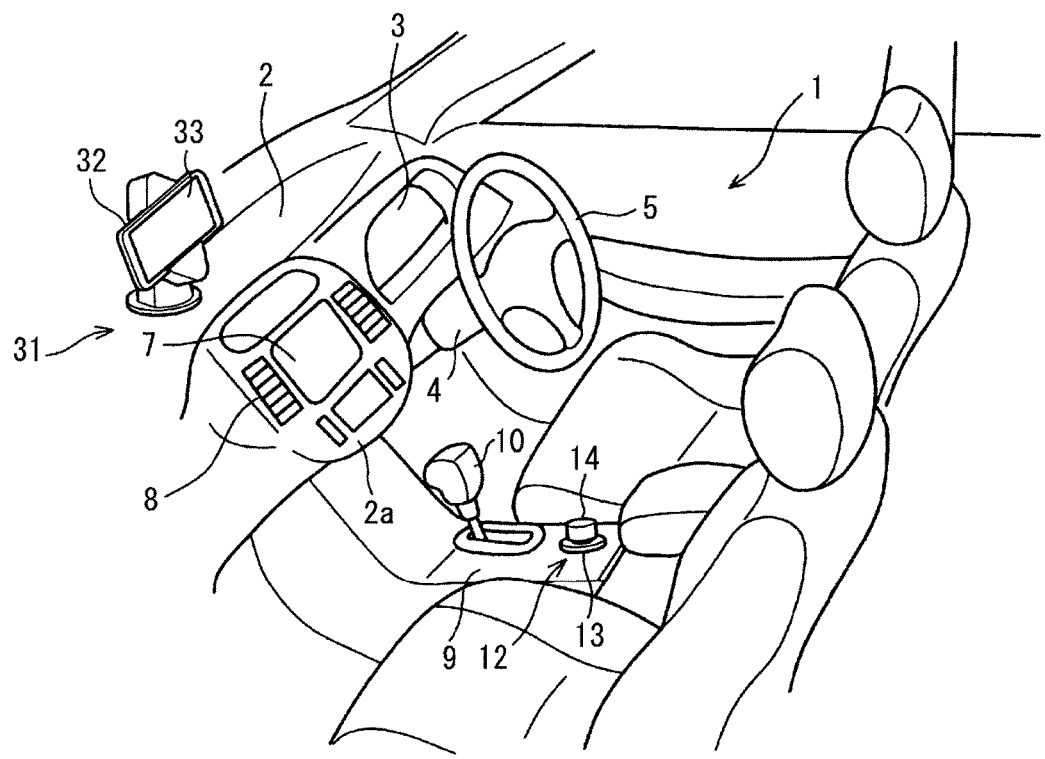
FIG. 6 is a diagram showing an appearance of a main part of a vehicle operating system according to a second embodiment of the present disclosure.

The following will describe a second embodiment of the present disclosure with reference to FIG. 6. FIG. 6 shows an outline arrangement of a vehicle operating system 31 according to the second embodiment. The vehicle operating system 31 includes, for example, a smartphone 32 serving as a hand-carried information device, and an operating device 12. The operating device 12 is similar to the operating device described in the first embodiment, and is designed to be attached to a position that conforms to the personal predilection of the user in the compartment 1. The same reference signs will be assigned to components equivalent to those of the first embodiment, and new illustration and an iterative description will be omitted.

A difference of the second embodiment from the first embodiment lies in a point that the operating device 12 is used to operate the smartphone 32 serving as a hand-carried information device carried into the compartment 1. As already known, the smartphone 32 includes a display device 33 formed on the face of the body of the smartphone 32, and the body of the smartphone 32 is equipped to a receiving unit of the instrument panel 2 in a detachable manner. The smartphone 32 includes a CPU (not shown), also includes navigation software and music software. The smartphone 32 implements a navigation function or music reproduction function on the basis of a selection manipulation performed by the user on a graphical user interface displayed on the screen of the display device 33.

Further, the smartphone 32 includes a communication unit (not shown) which is provided by a near field communication unit conformable to, for example, Wi-Fi or Bluetooth (registered trademark). The communication unit serves as a connection unit that connects the smartphone 32 with the communication unit 19 of the operating device 12 (perform wireless communication). The smartphone 32 includes an application program for connecting the smartphone to the operating device 12. By running the application program, the smartphone can be operated based on signals (rotation manipulation signal, determination signal, and attachment posture signal) sent from the operating device 12.

The smartphone 32 includes an embedded CPU that controls the screen of the display device 33. The CPU of the smartphone is similar to the CPU 11 of the in-vehicle device described in the first embodiment. That is, the CPU of the smartphone 32 functions as a display control unit that controls display of a graphical user interface (GUI) on the display device 33 in a form corresponding to an attachment posture signal produced by the posture detection sensor 18, and also functions as a selection display unit that controls display related to the selection manipulation performed on the graphical user interface on the basis of the rotation manipulation signal and the determination signal.

According to the second embodiment, when the smartphone 32 owned by a user is carried into the compartment 1 and placed on the instrument panel 2, the operating device 12 can be used to operate the smartphone 32. Similar to the first embodiment, the operating device 12 can be freely attached to a position that conforms to the personal predilection of the user in the compartment 1, and the display related to the manipulation made on the graphical user interface on the screen of the display device 33 of the smartphone 32 can keep a user from feeling uncomfortable (makes a user feel less uncomfortable). Accordingly, the operating device 12 can secure an improved manipulation performance.

In the second embodiment, the smartphone 32 is described as an example of a hand-carried information device that can be carried into the compartment 1 and can be used in the compartment 1. Except for the smartphone, a portable navigation device (PND) or a tablet type personal computer may be adopted as the hand-carried information device. By installing an application program, which is used to connect the hand-carried information device to the operating device 12, in the hand-carried information device, a vehicle operating system can be constructed as described above.

FIG. 7A to FIG. 10C show third embodiment to sixth embodiment of the present disclosure. In the third to sixth embodiments, examples of a display mode of a graphical user interface (GUI) on the screen of the display device 7 (for example, a menu screen image of the navigation device 21) other than the examples described in the first embodiment are presented. Even in the third to sixth embodiments, similar to the first embodiment, the operating device 12 can be freely attached to a position that conforms to the personal predilection of the user in the compartment 1, and displays, on the screen of the display device 7, a graphical user interface that keeps a user from feeling uncomfortable (make a user feel less uncomfortable). Accordingly, the improved manipulation performance of the operating device 12 can be ensured.

Third Embodiment

Figure 7A:
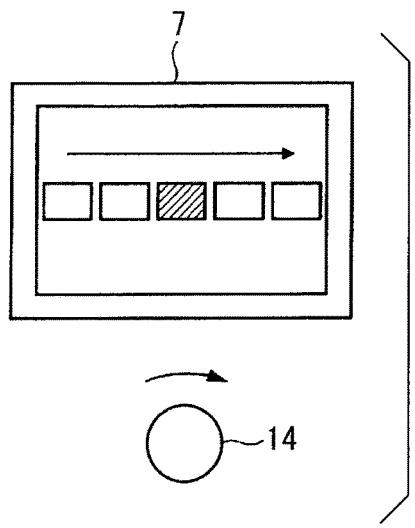
FIG. 7A and FIG. 7B are diagrams showing examples of display of a menu screen image of a navigation device on a display device in relation to two respective postures of an operating device according to a third embodiment of the present disclosure.
Figure 7B:
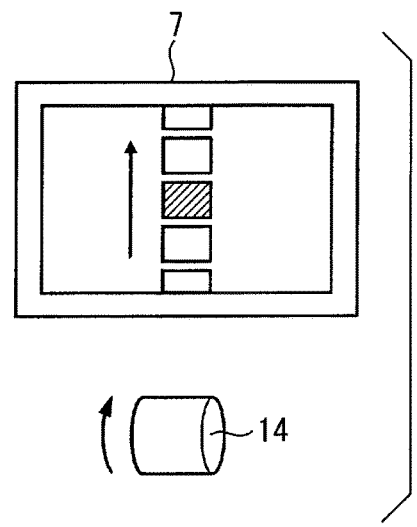

The third embodiment is shown in FIG. 7A and FIG. 7B. As shown in FIG. 7A, when the attachment posture of the operating device 12 is fore-and-aft orientation, icons expressing selectable menus are respectively displayed in a horizontal row on the screen of the display device 7. In this case, a cursor expressing which of the icons is selected is fixed to the center of the screen. When the rotatable knob 14 of the operating device 12 is rotated by the user clockwise (rightward), an entire screen image (multiple juxtaposed icons) is scrolled rightward.

When the rotatable knob 14 is rotated by the user counterclockwise (leftward), the entire screen image (juxtaposed icons) is scrolled leftward. Therefore, after a user manipulates or rotates the rotatable knob 14 so that an icon which the user wants to select comes to the center of the screen, the user manipulates or presses the rotatable knob 14 for determination.

In contrast, as in FIG. 7B, when the attachment posture of the operating device 12 is lateral (rightward) orientation, icons are displayed in a vertical column on the screen of the display device 7. Even in this case, a cursor expressing which of the icons is selected is fixed to the center of the screen. When the rotatable knob 14 is rotated by the user clockwise (rightward), an entire screen image (juxtaposed icons) is scrolled upward. When the operating knob 14 is rotated by the user counterclockwise (leftward), the entire screen image (juxtaposed icons) is scrolled downward.

Fourth Embodiment

Figure 8A:
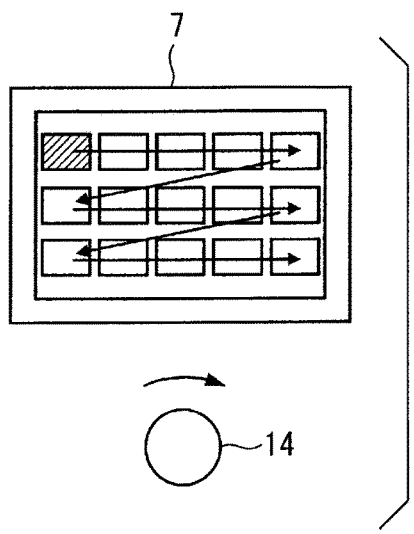
FIG. 8A and FIG. 8B are diagrams showing examples of display of a menu screen image of a navigation device on a display device in relation to two respective postures of an operating device according to a fourth embodiment of the present disclosure.
Figure 8B:
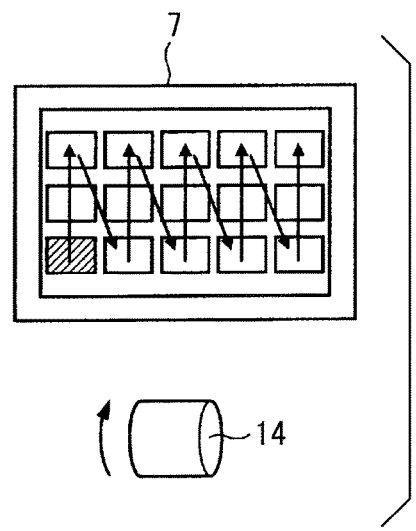

In the fourth embodiment shown in FIG. 8A and FIG. 8B, multiple (for example, fifteen) icons are arranged in five horizontal rows and three vertical columns on the screen of the display device 7. As shown in FIG. 8A, when the attachment posture of the operating device 12 is fore-and-aft orientation and the rotatable knob 14 is rotated by the user clockwise (rightward), a cursor expressing which of the icons is selected moves, as indicated with an arrow in the drawing, from left to right on an upper row, from left to right on a middle row, and from left to right on a lower row. When the rotatable knob 14 is rotated by the user counterclockwise (leftward), the cursor moves from right to left (sequentially from the lower row) in opposite manner.

In contrast, as in FIG. 8B, when the attachment posture of the operating device 12 is lateral (rightward) orientation and the rotatable knob 14 is rotated by the user clockwise (rightward), the cursor moves, as indicated with an arrow in the drawing, from down to up on the first column from the left side of the screen, from down to up on the second column from the left side of the screen, and similarly. When the rotatable knob 14 is rotated by the user counterclockwise (leftward), the cursor moves from up to down on the first column from the left side of the screen in opposite manner.

Fifth Embodiment

Figure 9A:
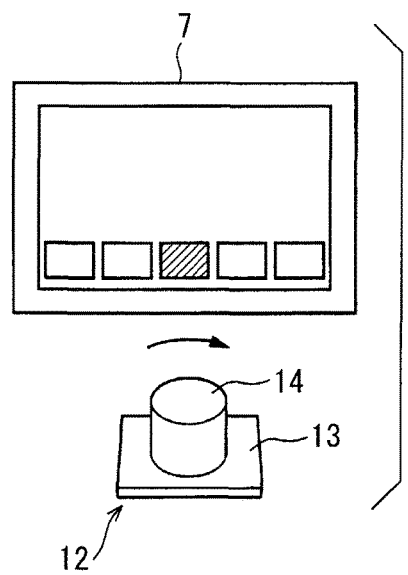
FIG. 9A to FIG. 9D are diagrams showing examples of display of a menu screen image of a navigation device on a display device in relation to four respective postures of an operating device according to a fifth embodiment of the present disclosure.
Figure 9B:
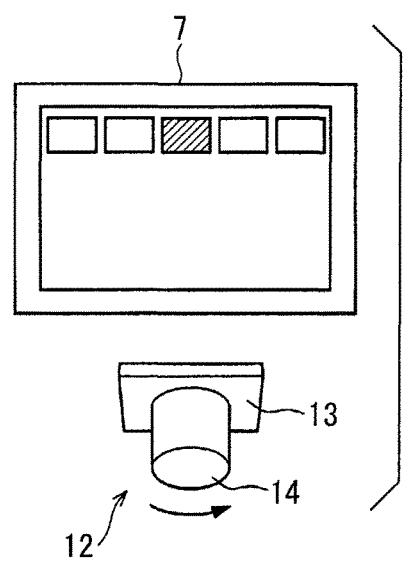

In the fifth embodiment shown in FIG. 9A to FIG. 9D, a display mode (display position on the screen) of icons in a menu screen image on the display device 7 is differentiated among four postures of the operating device 12. Specifically, as in FIG. 9A, when the attachment posture of the operating device 12 is horizontally upward orientation, icons are displayed in a horizontal row on the lower side of the screen of the display device 7. As shown in FIG. 9B, when the attachment posture of the operating device 12 is horizontally downward orientation (upside-down placement), the icons are displayed in a horizontal row on the upper side of the screen of the display device 7.

Figure 9C:
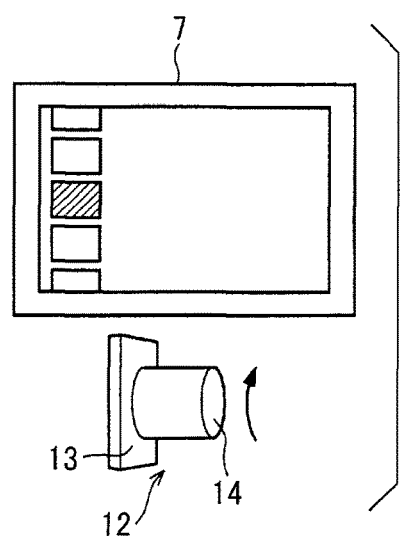
Figure 9D:
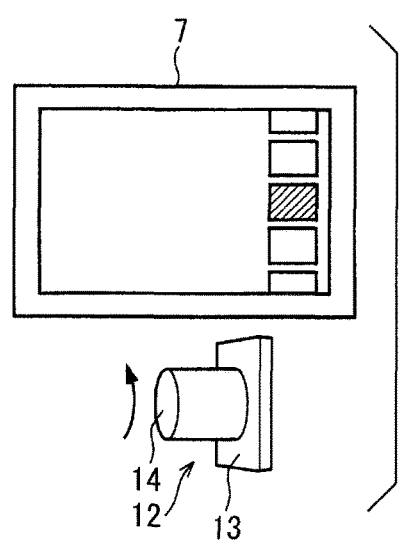

As shown in FIG. 9C, when the attachment posture of the operating device 12 is lateral (rightward) orientation, the icons are displayed in a vertical column along the left side of the screen of the display device 7. As shown in FIG. 9D, when the attachment posture of the operating device is lateral (leftward) orientation, the icons are displayed in a vertical column along the right side of the screen of the display device 7. Thus, a graphical user interface can be displayed corresponding to the attachment position to which the operating device 12 is attached.

Sixth Embodiment

Figure 10A:
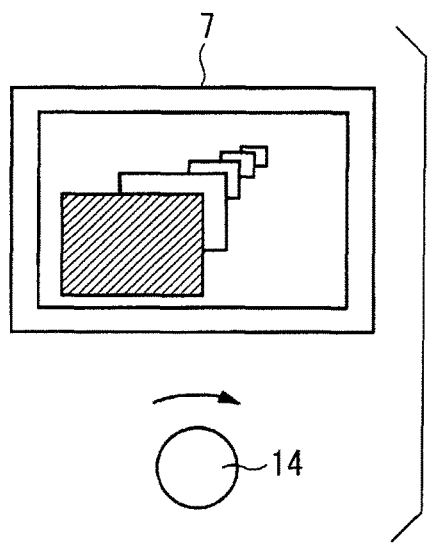
FIG. 10A to FIG. 10C are diagrams showing examples of display of a menu screen image of a navigation device on a display device in relation to three respective postures of an operating device according to a sixth embodiment of the present disclosure.
Figure 10B:
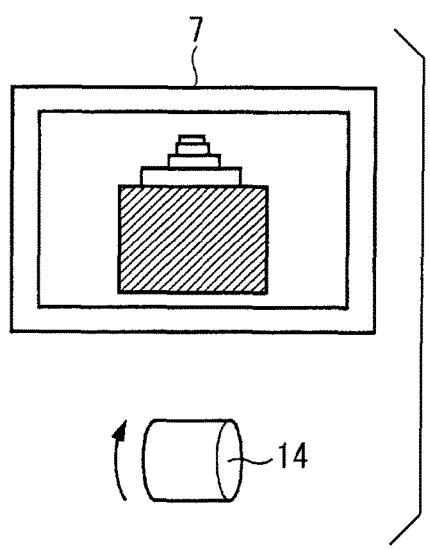
Figure 10C:
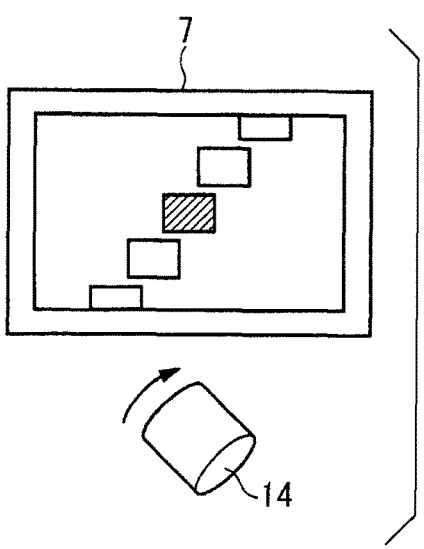

In the sixth embodiment shown in FIG. 10A to FIG. 10C, display of icons on the screen of the display device 7 is varied depending on the attachment posture of the operating device 12. As shown in FIG. 10A, when the attachment posture of the operating device 12 is fore-and-aft orientation, icons each representing a selectable menu are displayed on the screen of the display device 7 using the perspective so that the icons sequentially overlap from a front left corner to a right deep end. In this case, the icon located foremost represents the selectable menu. Depending on the direction of a rotation manipulation made on the rotatable knob 14, the icons move in a font-back direction.

As shown in FIG. 10B, when the attachment posture of the operating device 12 is lateral (rightward) orientation, icons are displayed on the screen of the display device 7 using the perspective so that the icons sequentially overlap from a front center to a straight deep end. As shown in FIG. 10C, when the attachment posture of the operating device 12 is right downward orientation, the icons are displayed on the screen of the display device 7 so that the icons are arranged slantwise from a left lower edge to a right upper edge. In this case, when the rotatable knob 14 is rotated by the user clockwise (rightward), the cursor moves in a right upward direction. When the rotatable knob 14 is rotated counterclockwise (leftward), the cursor moves in a left downward direction.

Other Embodiments

In the first embodiment, a case where the display device 7 included in the vehicle operating system 6 is incorporated in the instrument panel central portion 2a is cited as an example. Alternatively, the vehicle operating system may be designed to control display relevant to a display device incorporated in the meter unit 3. In the first embodiment, the operating device 12 has the built-in battery 20. A system of the present disclosure may be designed to connect (simple connection using a connector) an operating device and in-vehicle device by wire (power line and signal line). In this case, power can be obtained from a vehicle. The present disclosure is not limited to the aforesaid embodiments. For example, the hardware configuration of the operating device and a concrete display mode of a graphical user interface can be modified in various different manners. Appropriate modification can be made without a departure from the gist of the disclosure.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:
1. A vehicle operating system comprising:
an operating device disposed in a compartment of a vehicle; and an in-vehicle device equipped to the vehicle and including a display device, wherein
the in-vehicle device selects a graphical user interface displayed on a screen of the display device of the in-vehicle device corresponding to a selection manipulation made by a user to the operating device,
the operating device includes:
a base attaching the operating device to a portion in the compartment of the vehicle according to a personal predilection of the user;
a rotatable knob supported by the base and being rotatable in response to a rotation manipulation made by the user to the rotatable knob;
a posture detector detecting an attachment posture of the operating device and generating an attachment posture signal indicating the attachment posture of the operating device;
a connection unit connecting the operating device to the in-vehicle device;
a manipulation signal output unit outputting, to the in-vehicle device, a manipulation signal generated in response to a rotation of the rotatable knob; and
a posture signal output unit outputting, to the in-vehicle device, the attachment posture signal generated by the posture detector, and
the in-vehicle device includes:
a display control unit controlling the display device to display the graphical user interface corresponding to the attachment posture signal output from the posture signal output unit; and
a selection display unit controlling the display device to perform a display related to the selection of the graphical user interface in a display mode corresponding to the manipulation signal output from the manipulation signal output unit,
wherein the posture detector detects, as the attachment posture of the operating device, a direction in which a rotating axial center of the rotatable knob extends with reference to a traveling direction of the vehicle.

2. The vehicle operating system according to claim 1, wherein
the display control unit controls the display device to display, on the screen of the display device, the graphical user interface in a direction corresponding to the attachment posture signal.

3. The vehicle operating system according to claim 1, wherein
the display control unit controls the display device to display, on the screen of the display device, the graphical user interface at a position corresponding to the attachment posture signal.

4. The vehicle operating system according to claim 1, wherein
the operating device further includes a determination switch that turns on in response to a determination manipulation determining a selection of the graphical user interface, and
the manipulation signal output unit outputs a determination signal in response to a turning on of the determination switch.

5. The vehicle operating system according to claim 4, wherein
the rotatable knob included in the operating device is pressable against the base by the user, and
the determination switch turns on when the rotatable knob is pressed by the user.

6. The vehicle operating system according to claim 1, wherein
the connection unit is provided by a wireless communication unit.

7. The vehicle operating system according to claim 1, wherein
the operating device further includes a battery providing a power supply.

8. The vehicle operating system according to claim 1, wherein
the posture detector includes at least one of a gyro sensor, a tilt sensor, and an acceleration sensor.

9. The vehicle operating system according to claim 1, wherein,
when the attachment posture is in an up-and-down orientation, the display control unit displays the graphical user interface for the up-and-down orientation on the display device,
when the attachment posture is in a fore-and-aft orientation, the display control unit displays the graphical user interface for the fore-and-aft orientation on the display device, and
when the attachment posture is in a lateral orientation, the display control unit displays the graphical user interface for the lateral orientation on the display device.

10. A vehicle operating system comprising:
an operating device disposed in a compartment of a vehicle; and
a hand-carried information device carried into the compartment of the vehicle by a user and including a display device, wherein
the hand-carried information device selects a graphical user interface displayed on a screen of the display device of the hand-carried information device corresponding to a selection manipulation made by the user to the operating device,
the operating device includes:
a base attaching the operating device to a portion in the compartment of the vehicle according to a personal predilection of the user;
a rotatable knob supported by the base and being rotatable in response to a rotation manipulation made by the user to the rotatable knob;
a posture detector detecting an attachment posture of the operating device and generating an attachment posture signal indicating the attachment posture of the operating device;
a connection unit connecting the operating device to the hand-carried information device;
a manipulation signal output unit outputting, to the hand-carried information device, a manipulation signal generated in response to a rotation of the rotatable knob; and
a posture signal output unit outputting, to the hand-carried information device, the attachment posture signal generated by the posture detector, and
the hand-carried information device includes:
a display control unit controlling the display device to display the graphical user interface corresponding to the attachment posture signal output from the posture signal output unit; and
a selection display unit controlling the display device to perform a display related to the selection of the graphical user interface in a display mode corresponding to the manipulation signal output from the manipulation signal output unit, wherein the posture detector detects, as the attachment posture of the operating device, a direction in which a rotating axial center of the rotatable knob extends with reference to a traveling direction of the vehicle.

11. The vehicle operating system according to claim 10, wherein
the display control unit controls the display device to display, on the screen of the display device, the graphical user interface in a direction corresponding to the attachment posture signal.

12. The vehicle operating system according to claim 10 wherein
the display control unit controls the display device to display, on the screen of the display device, the graphical user interface at a position corresponding to the attachment posture signal.

13. The vehicle operating system according to claim 10, wherein
the operating device further includes a determination switch that turns on in response to a determination manipulation determining a selection of the graphical user interface, and
the manipulation signal output unit outputs a determination signal in response to a turning on of the determination switch.

14. The vehicle operating system according to claim 13, wherein
the rotatable knob included in the operating device is pressable against the base by the user, and
the determination switch turns on when the rotatable knob is pressed by the user.

15. The vehicle operating system according to claim 10, wherein
the connection unit is provided by a wireless communication unit.

16. The vehicle operating system according to claim 10, wherein
the operating device further includes a battery providing a power supply.

17. An information device disposed in a compartment of a vehicle, the information device comprising:
a display device;
a display control unit controlling the display device to display a graphical user interface on a screen of the display device corresponding to an attachment posture of an operating device, wherein the operating device is attached to a portion in the compartment of the vehicle by a user according to a personal predilection of the user; and
a selection display unit controlling the display device to perform a display related to a selection of the graphical user interface corresponding to a manipulation signal transmitted from the operating device, wherein the graphical user interface displayed on the screen of the display device is selected based on a selection manipulation made by the user to the operating device,
wherein the attachment posture of an operating device is defined as a direction in which a rotating axial center of a rotatable knob of the operating device extends with reference to a traveling direction of the vehicle.

* * * * *